US011981324B2

(12) United States Patent
Mielenz

(10) Patent No.: US 11,981,324 B2
(45) Date of Patent: May 14, 2024

(54) METHOD FOR PROVIDING A SIGNAL FOR ACTUATING AN AT LEAST PARTIALLY AUTOMATED VEHICLE

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 17/078,200

(22) Filed: Oct. 23, 2020

(65) Prior Publication Data

US 2021/0122363 A1  Apr. 29, 2021

(30) Foreign Application Priority Data

Oct. 24, 2019  (DE) .................... 10 2019 216 363.7

(51) Int. Cl.
*B60W 30/06* (2006.01)
*B60W 30/095* (2012.01)
(Continued)

(52) U.S. Cl.
CPC ........ *B60W 30/06* (2013.01); *B60W 30/0956* (2013.01); *B60W 40/04* (2013.01); *B60W 40/06* (2013.01); *B60W 60/001* (2020.02); *G08G 1/143* (2013.01); *G08G 1/149* (2013.01); *G08G 1/168* (2013.01); *B60W 2554/20* (2020.02); *B60W 2554/4044* (2020.02); *B60W 2554/4045* (2020.02); *B60W 2554/4046* (2020.02)

(58) Field of Classification Search
CPC .. B60W 30/06; B60W 30/0956; B60W 40/04; B60W 40/06; B60W 60/001; B60W 2554/20; B60W 2554/4044; B60W 2554/4045; B60W 2554/4046; G08G 1/143; G08G 1/149; G08G 1/168
See application file for complete search history.

(56) References Cited

U.S. PATENT DOCUMENTS

2003/0197660 A1* 10/2003 Takahashi .............. G08G 1/168
345/7
2015/0094887 A1* 4/2015 Kawashima ............ H02J 50/60
320/108

(Continued)

FOREIGN PATENT DOCUMENTS

DE  102010030208 A1 * 12/2011 ............ B60W 30/06
DE  10 2011 087 774 A1  6/2013
(Continued)

OTHER PUBLICATIONS

Translation of DE 102010030208A1 (Year: 2010).*

*Primary Examiner* — Kenneth J Malkowski
(74) *Attorney, Agent, or Firm* — Maginot, Moore & Beck LLP

(57) ABSTRACT

A method for providing a signal for actuating an at least partially automated vehicle includes receiving surroundings data; detecting a vehicle which is leaving a parking space and is initiating or executing a parking-space-exiting maneuver, on the basis of the surroundings data; predicting a maneuvering area which the vehicle which is leaving the parking space requires to execute the parking-space-exiting maneuver; and providing a signal for actuating the at least partially automated vehicle on the basis of the predicted maneuvering area.

14 Claims, 2 Drawing Sheets

(51) Int. Cl.
  B60W 40/04   (2006.01)
  B60W 40/06   (2012.01)
  B60W 60/00   (2020.01)
  G08G 1/14    (2006.01)
  G08G 1/16    (2006.01)

(56) References Cited

U.S. PATENT DOCUMENTS

| | | | | |
|---|---|---|---|---|
| 2016/0063865 | A1* | 3/2016 | Flemhmig | G08G 1/167 |
| | | | | 348/46 |
| 2018/0111609 | A1* | 4/2018 | Woo | B60W 30/18036 |
| 2018/0162446 | A1* | 6/2018 | Mikuriya | B62D 15/028 |
| 2018/0370566 | A1* | 12/2018 | Kojo | G06V 20/586 |
| 2019/0118801 | A1* | 4/2019 | Noh | B62D 15/0285 |
| 2019/0256090 | A1* | 8/2019 | Yoo | B60W 30/18163 |
| 2019/0303691 | A1* | 10/2019 | Maeda | G06K 9/629 |
| 2019/0355132 | A1* | 11/2019 | Kushleyev | G06V 20/56 |
| 2020/0114820 | A1* | 4/2020 | Ito | G08G 1/168 |
| 2020/0175869 | A1* | 6/2020 | Khoo | G08G 1/147 |
| 2020/0216063 | A1* | 7/2020 | Lim | B60W 30/095 |
| 2020/0262418 | A1* | 8/2020 | Lin | B60W 30/0956 |

FOREIGN PATENT DOCUMENTS

| | | |
|---|---|---|
| DE | 10 2013 205 882 A1 | 10/2014 |
| DE | 10 2015 202 480 A1 | 8/2016 |
| DE | 10 2016 205 142 A1 | 10/2017 |
| DE | 10 2016 221 905 A1 | 5/2018 |

* cited by examiner

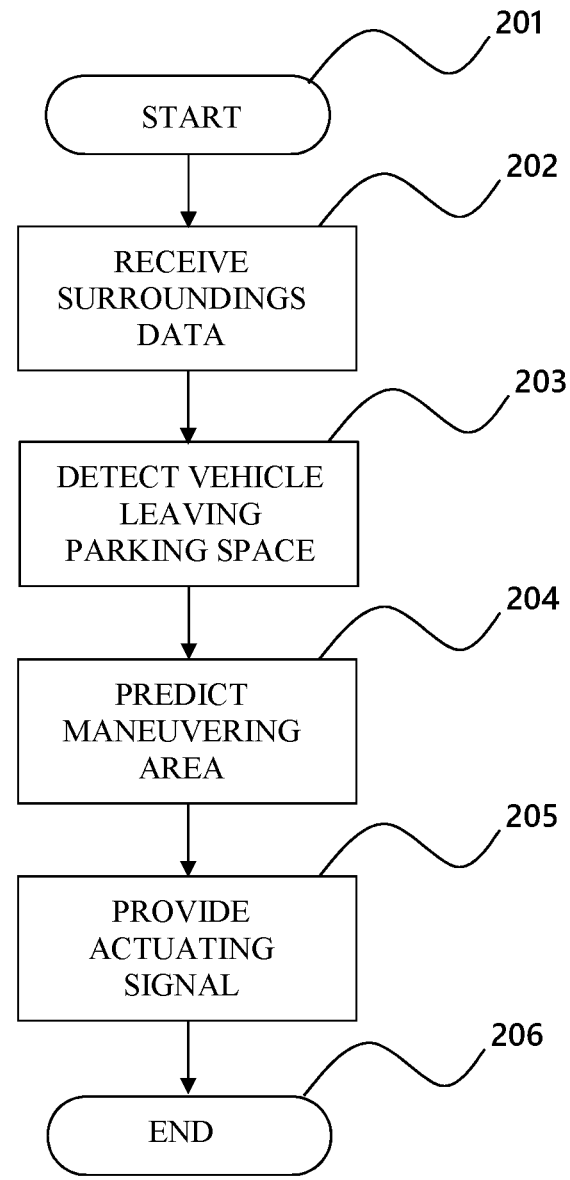

METHOD FOR PROVIDING A SIGNAL FOR ACTUATING AN AT LEAST PARTIALLY AUTOMATED VEHICLE

This application claims priority under 35 U.S.C. § 119 to patent application no. DE 10 2019 216 363.7, filed on Oct. 24, 2019 in Germany, the disclosure of which is incorporated herein by reference in its entirety.

The disclosure relates to a method for providing a signal for actuating an at least partially automated vehicle, a device which is configured to execute the method, a computer program for executing the method, and a machine-readable storage medium in which this computer program is stored.

BACKGROUND

DE 10 2011 087 774 A1 claims a method for monitoring and signaling a traffic situation in the surroundings of a vehicle.

SUMMARY

The disclosure describes a method for providing a signal for actuating an at least partially automatic vehicle, and comprises the steps:
receiving of surroundings data;
detecting a vehicle which is leaving the parking space and is initiating or executing a parking-space-exiting maneuver, on the basis of the surroundings data;
predicting a maneuvering area which the vehicle which is leaving the parking space requires to execute the parking-space-exiting maneuver; and
providing a signal for actuating the at least partially automated vehicle on the basis of the predicted maneuvering area.

A vehicle which is operated in an at least partially automated fashion or is partially automated is understood to be a vehicle which is operated in a partially, highly or fully automated fashion. In particular, the automated vehicle may be a vehicle which is operated in a driverless fashion and which can be operated at least partially without human intervention. The vehicle may be, for example, a classic passenger car, a truck, a minibus or a shuttle. Furthermore, the vehicle may also be other types of vehicle such as two-wheeled vehicles or three-wheeled vehicles.

The surroundings data may be, for example, data on the surroundings of the automated vehicle which is recorded by means of a sensor. The sensors may be, for example, sensors of a vehicle such as video sensors, radar sensors, lidar sensors and/or ultrasonic sensors. The data may also be acoustic data from microphones. The sensors can also be attached to other vehicles and/or to infrastructure equipment.

Moreover, the surroundings data may also be already-evaluated data from other road users and/or an external server. For example, a plurality of data items which are received from a server may already have been aggregated and evaluated on this server.

The detection of the vehicle which is leaving a parking space is carried out on the basis of the surroundings data. In this context, for example different areas, in particular a driving area and a parking area, can be determined and vehicles which are located on the determined areas may be assigned to a category on the basis of this determination. If the vehicle is located in the parking area, it is detected as a parking vehicle, and if it is located in the driving area, it is detected as a non-parking vehicle. A plurality of influencing variables/features can be used here and these are described in the exemplary embodiments. The fact that the parking vehicle actually initiates or is already executing a parking-space-exiting maneuver can be determined on the basis of a plurality of features. Indications that the parked vehicle is leaving or wishes to leave its parking space are, for example, the vehicle lights/headlights. A reversing light indicates an imminent parking-space-exiting process, as does a switched-on dipped headlight. For example, the current speed of the detected vehicles can also be included in the detection of the vehicle which is leaving the parking space. In further embodiments and exemplary embodiments further features are introduced.

A maneuvering area which the vehicle which is leaving the parking space requires to execute the parking-space-exiting maneuver is predicted on the basis of the detection. This prediction can be made, for example, on the basis of a predicted trajectory of the vehicle which is leaving the parking space, in combination with the geometric dimensions of said vehicle. The dimensions of the vehicle can be obtained, for example, on the basis of acquired surroundings data or by reading out data of a detected vehicle model. It is therefore possible, for example, to transform the predicted trajectory into an area which is travelled over/a space which is travelled through, on the basis of the sensed contour of the vehicle which is leaving a parking space.

A signal for actuating the at least partially automated vehicle is provided on the basis of the predicted maneuvering area. The objective here is to avoid an accident situation or blocking situation. For this purpose, the at least partially automated vehicle can be controlled, for example, in such a way that penetration into the predicted maneuvering area of the vehicle which is leaving a parking space is avoided until the parking-space-exiting maneuver is terminated.

Alternatively or additionally, the detection of a vehicle which is leaving a parking space and/or the prediction of the maneuvering area can also be carried out by means of a car-to-car connection, that is to say a connection between two or more vehicles, or a car-to-X connection, that is to say a connection between the vehicle and any other further unit, such as a server, or infrastructure equipment or a passer-by, for example via their cellphone. In this context, for example the vehicle which is leaving the parking space can itself communicate that a parking-space-exiting process is planned and is directly imminent and, if appropriate, transfers the planned trajectory. At the same time or alternatively, an area which is required for the parking-space exiting maneuver can also be transmitted. Moreover, the planned duration of the parking-space-exiting maneuver can be transmitted so that the period of time in which the required area is not to be travelled on becomes apparent to the at least partially automated vehicle. A signal of a piece of infrastructure equipment, for example a modified lamp pole with an integrated camera and an integrated control device can also be received. This infrastructure equipment can be designed to detect parking-space-exiting processes and to carry out communication with vehicles which are located per se in the vicinity. The detection by means of the infrastructure equipment can be carried out, for example, on the basis of an algorithm which is implemented in the infrastructure equipment and is trained by means of a machine learning method.

The signal for actuation can be provided, for example, to a control unit of the at least partially automated vehicle, so that an automatic and therefore very rapid reaction of the vehicle can also be carried out completely independently of a vehicle occupant or a driver of the vehicle.

The method can be carried out, for example, in a vehicle in one or more vehicle control devices. Alternatively, the method can also be carried out externally to the vehicle, on a spatially separate server or a control device in a piece of infrastructure equipment such as a set of traffic lights.

The provision can be implemented in the cable-bound or cableless fashion. If the transmission takes place from a server or an external unit to a vehicle, the transmission preferably takes place in a cableless fashion, for example via a cellphone network. When the method is executed in a vehicle and this vehicle is actuated, the transmission can also take place in an exclusively cable-bound fashion.

The described method and system permit the vehicle which drives in an automated fashion to avoid, during the automated travel on a road which has priority, a blocking situation with a further road user which is leaving a parking space, since a required maneuvering area of the other road user which is leaving a parking space is not blocked. This method also makes possible comfort control or even emergency control of the driving behavior of the automated vehicle in reaction to the vehicle which is leaving the parking space.

The method also provides further advantages: on the one hand, unpleasant driving situations of an at least partially automated vehicle for the passengers are avoided by reducing uncomfortable braking maneuvers. In addition, the prediction capability for traffic situations lying ahead is increased. Moreover, both the customer rating and the societal acceptance of automated vehicles are increased.

In a further embodiment of the method, the at least partially automated vehicle is actuated on the basis of the signal in such a way that said vehicle does not enter the maneuvering area during the parking-space-exiting maneuver of the vehicle which is leaving the parking space.

The implementation of this method is possible by means of different actions to be carried out. For example, the trajectory can be planned in such a way that entry into the maneuvering area during the parking-space-exiting maneuver is avoided. For this purpose, for example, the speed, the acceleration or the planned lane selection can be adapted. For example, the speed can be reduced, a starting point detected and the vehicle can be stopped therein, or a lane change can be carried out. For example, a stopping line can be determined on the basis of the maneuvering area lying ahead, in such a way that the front area of the at least partially automated vehicle is not in contact, including a safety distance, with the maneuvering area. A trajectory can be calculated from the current position of the at least partially automated vehicle to the determined stopping line using known methods which comfortably stop the at least partially automated vehicle. Alternatively or additionally, the speed of the at least partially automated vehicle can already be reduced after a vehicle leaving a parking space is detected if a parking-space-exiting process which has been started is detected with a certain degree of uncertainty. As a result, comfortable implementation of the stopping process is made possible.

In a further embodiment of the method, the at least partially automated vehicle is actuated in such a way that it does not undershoot a predefined safety distance from the maneuvering area during the parking-space-exiting maneuver, or the maneuvering area is increased by a predefined safety distance.

In this context, either a stopping line which must not be travelled over by the at least partially automated vehicle can be determined on the basis of the predicted maneuvering area, and an additional stopping line can be determined, during the determination of which a predefined safety distance has been added. In this case, this second stopping line replaces the first stopping line and should or must not be travelled over.

Alternatively or additionally, an additional safety distance is also already taken into account during the prediction of the maneuvering area, so that the area which is required for the parking-space-exiting maneuver is enlarged and therefore the area in which the at least partially automated vehicle should not enter or must not enter is also enlarged.

The additionally provided safety distance increases the safety in the automated mode for the vehicle occupants of the vehicle which drives in an automated fashion and of other vehicles.

In a further embodiment of the method the detection of the vehicle which is leaving a parking space is carried out on the basis of sensing of at least one longitudinal parking space and/or diagonal parking space and the determination of its degree of occupancy.

The determination of diagonal parking spaces or longitudinal parking spaces and vehicles which are located in these parking spaces makes it possible to determine in advance possible candidates which can be considered as vehicles which are leaving a parking space. Vehicles which are leaving a parking space can then be detected on the basis of this determination.

In a further embodiment of the method, the detection of the vehicle which is leaving the parking space is carried out on the basis of an analysis of the state of a flashing indicator light, brake light, reversing light, dipped headlight and/or passenger compartment lighting system of the vehicle which is leaving a parking space. The specified features indicate that the sensed vehicle is not merely a parked vehicle but also a vehicle which is expected to drive away imminently or has already driven away. In particular, a reversing light indicates that the detected vehicle will imminently drive along a rearward-directed trajectory.

In a further embodiment of the method, the detection of the vehicle which is leaving the parking space is carried out on the basis of determination of the orientation of the vehicle which is leaving the parking space with respect to a parking area and/or a lane which is being travelled on by the at least partially automated vehicle, in particular of determination of a change in the orientation over time.

Both the parking area and the lane travelled along by the vehicle which is operated in an at least partially automated fashion can be determined, for example, on the basis of map data and/or received surroundings data.

A change in the orientation over time indicates a movement of the vehicle leaving the parking space and permits conclusions to be drawn about its planned trajectory and its planned driving maneuver. Generally the orientation is a reliable indication, in particular in the case of the detection of vehicles which are parked laterally in the direction of travel, of the detection of an imminent parking-space-exiting process.

In a further embodiment of the method, the orientation is determined on the basis of sensing of the contour of the lane, of the parking area and/or of the vehicle which is leaving a parking space.

In a further embodiment of the method it is determined that a parking-space-exiting process is directly imminent if the orientation of the vehicle which is leaving the parking space exceeds a predefined angle with respect to a previously determined or received contour of the parking area and/or of the lane.

The exceeding can occur, in particular, while the orientation of the vehicle which is leaving a parking space is monitored over time. That is to say the orientation of the vehicle which is leaving a parking space initially does not exceed the angle. However, during the observation of the vehicle which is leaving a parking space said angle changes over time and ultimately exceeds the predefined angle. The contour of the parking area or lane can be obtained on the basis of acquired surroundings data. It can be alternatively or additionally also received or read out, for example from a high-precision map.

In a further embodiment of the method, the detection of the vehicle which is leaving the parking space is carried out on the basis of determination of an angle of orientation of the vehicle which is leaving the parking space with respect to a previously determined or received contour of the parking area and/or of the lane.

If, for example, a predefined angle is exceeded, this indicates that the vehicle which is leaving a parking space is actually carrying out a parking-space exiting maneuver or plans to carry one out.

In a further embodiment of the method prediction of the maneuvering area is made on the basis of determination of a wheel base of the vehicle which is leaving a parking space, in particular on a turning circle which is derived from the wheel base.

In particular, a maximum turning circle can be derived on the basis of the determination of the wheel base. A prediction of the area which is required for the parking-space-exiting process can be made on the basis of this maximum turning circle.

The wheel base and/or the dimensions of the vehicle which is leaving a parking space can be obtained by means of classification (video, radar, lidar) and/or the retrieving of stored information. For example, this information can be estimated from sensor data directly by means of known classification methods and/or measurement.

In a further embodiment of the method, the prediction of the maneuvering area is made on the basis of determination of an available road width.

In a further embodiment of the method, the prediction of the maneuvering area is made on the basis of determination of a number of required driving movements of the vehicle which is leaving a parking space, in order to execute the parking-space-exiting maneuver, in particular while taking into account determined vehicle dimensions of the vehicle which is leaving a parking space.

For the determination of the number of required driving movements it is possible to adopt empirical values or simulate different possibilities. The possibility which takes up the largest maneuvering area can be used as a final maneuvering area. This ensures that during the parking-space-exiting maneuver, a vehicle is prevented from driving into the maneuvering area of the vehicle which is operated in an automated fashion. The determination of the required driving movements can also be performed, for example, by an algorithm which has been trained by means of a machine learning method.

In a further embodiment of the method, the prediction of the maneuvering area is made on the basis of detection of raised objects and of determination of an available driving corridor on the basis of these objects.

Raised objects can be understood to be, for example, infrastructure equipment such as street lamps, sets of traffic lights, road signs or the like, other vehicles, kerb stones and other objects such as stones, walls or the like.

All the above-mentioned features which can be used to predict the maneuvering area serve to bring about an improvement in the predicted maneuvering area. The better the determined maneuvering area, the lower the risk of possible blocking situations or safety-critical traffic situations.

The approach represented here also produces an apparatus which is designed to carry out, actuate and/or implement the steps in the variant of a method represented here in corresponding devices. This embodiment variant of the disclosure in the form of an apparatus can also quickly and efficiently achieve the object on which the disclosure is based.

For this purpose, the apparatus can have at least one computing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data which is embedded in a communication protocol. The computer unit can be, for example, a signal processor, a microcontroller or the like, wherein the memory unit can be a flash memory, an EEPROM or a magnetic memory unit. The communication interface can be designed to read in or output data in a wireless fashion and/or line-bound fashion, wherein a communication interface which can read in or output line-bound data can read in this data, for example, electrically or optically from a corresponding data transmission line or output it into a corresponding data transmission line.

An apparatus can be understood here to be an electrical device which processes sensor signals and outputs control signals and/or data signals as a function thereof. The apparatus can have an interface which can be embodied by means of hardware and/or software. In a hardware implementation, the interfaces may be, for example, part of what is referred to as a system ASIC which includes a wide variety of functions of the apparatus. However, it is also possible for the interfaces to be separate integrated circuits or to be composed, at least partially, of discrete components. In a software embodiment, the interfaces may be software modules which are present, for example, in a microcontroller alongside other software modules.

A computer program with program code which can be stored on a machine-readable carrier or storage medium such as a semiconductor memory, a hard disk memory or an optical memory and is used to carry out, implement and/or actuate the steps of the method according to one of the embodiments described above is advantageously used, in particular if the program product or program is run on a computer or an apparatus.

BRIEF DESCRIPTION OF THE DRAWINGS

FIG. 2 shows a schematic method diagram.

DETAILED DESCRIPTION

Figure 1:
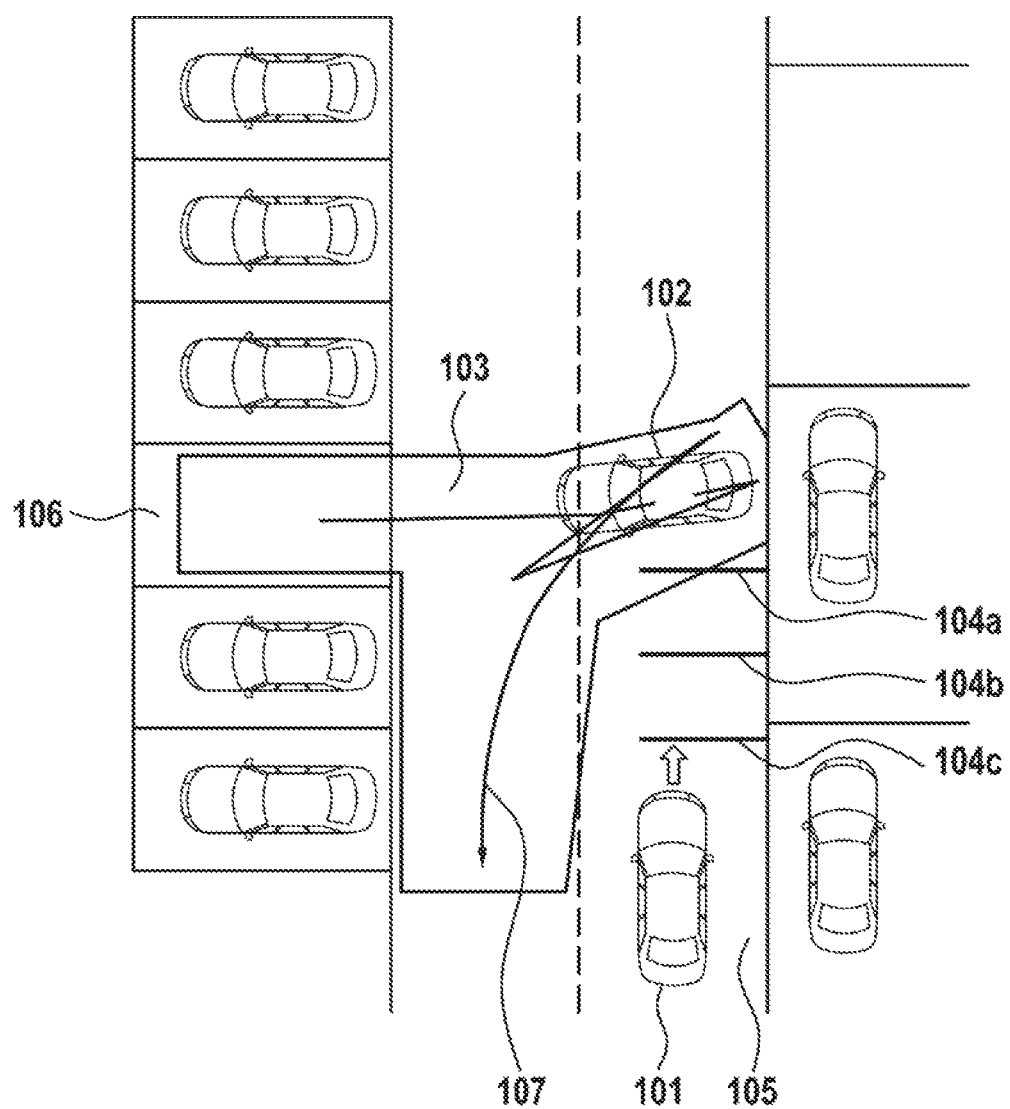
FIG. 1 shows an exemplary traffic situation.

In a first exemplary embodiment a vehicle 101 which is operated in a fully automated fashion, that is to say a vehicle 101 which is operated at least temporarily without intervention by a driver, is in the traffic situation illustrated in FIG. 1. The automated vehicle 101 is equipped with a plurality of surroundings sensors, including cameras, lidar sensors, radar sensors, ultrasonic sensors and microphones. The vehicle 101 is operated by a central control device on the basis of the data acquired by means of the surroundings sensors. The automated vehicle 101 is driving on a road 105, at the edge of which there are parking spaces for parking vehicles. A vehicle 102 which is leaving a parking space will leave a parking space 106 in reverse. The parking-space-exiting maneuver which is necessary for this can be implemented only as a multi-movement maneuver owing to the available space, which is illustrated in FIG. 1 by the trajectory 107 travelled along by the vehicle 102 which is leaving the parking space. For the maneuvering, the vehicle 102 which is leaving the parking space requires the maneuvering area 103 which is also indicated. Furthermore, three possible lines 104a, 104b, 104c are shown, said lines representing possible drive boundaries or stopping positions of the vehicle 101 which drives in an automated fashion.

In order to avoid impeding the vehicle 102 which is leaving a parking space during its parking-space-exiting maneuver, as a result of which a blocking situation could be triggered, the method which is outlined in FIG. 2 runs in the vehicle 101 which drives in an automated fashion, said method starting in step 201.

In step 202, surroundings data is received by a control device of the automated vehicle 101. Said data originates, on the one hand, from the vehicle's own sensors, and on the other hand, signals from other automated vehicles and correspondingly configured infrastructure elements are additionally received. In particular, these are objects which have already been determined and their dimensions, position and expected trajectories.

In step 203, the vehicle 102 which is leaving a parking space and is executing a parking-exiting maneuver is detected on the basis of the received surroundings data. In this context, different received and acquired intention features of the vehicle 102 which is leaving a parking space are evaluated and weighted. On the one hand, kinematic variables of the vehicle, in particular movements of the vehicle, are assessed. Furthermore, a probability is determined as to whether the vehicle will be anticipated to move in the imminent future and possibly carry out a parking-space-exiting process. The intention features such as the status of the headlights, the position of the tires, engine noise and the presence of vehicle occupants are used for this. Since in this exemplary embodiment the vehicle 102 which is leaving a parking space is already in the middle of executing the parking-space-exiting maneuver and in the process already blocks the lane 105 of the vehicle 101 which is driving in an automated fashion, the detection is primarily carried out on the basis of the position of the vehicle 102 which is leaving a parking space and its speed and the trajectory which has already been travelled along by the vehicle 102 which is leaving a parking space.

In step 204, a maneuvering area 103 which the vehicle 102 which is leaving a parking space requires to execute the parking-space-exiting maneuver is predicted. For this, the dimensions of the vehicle 102 which is leaving a parking space, that is to say its width and length, are determined on the basis of the acquired surroundings data. In addition, a trajectory 107 of the vehicle 102 which is leaving the parking space is predicted. The prediction of the trajectory 107 is carried out, inter alia, on the basis of a wheel base, derived from the surroundings data, of the vehicle 102 which is leaving a parking space. The maneuvering area 103 is determined on the basis of the predicted trajectory and the dimensions of the vehicle 102 which is leaving a parking space.

In step 205, a signal for actuating the automated vehicle 101 is provided on the basis of the predicted maneuvering area 103. The automated vehicle 101 is actuated on the basis of the provided signal, in such a way that entry of the automated vehicle 101 into the maneuvering area 103 during the parking-space-exiting maneuver of the vehicle 102 which is leaving the parking space is prevented. For this, the speed of the automated vehicle 101 is reduced in this exemplary embodiment, so that during the parking-space-exiting maneuver the vehicle 101 is prevented from travelling over the boundary line 104c.

The method ends in step 206.

In a further exemplary embodiment, a vehicle which is operated in an automated fashion is in a comparable situation, as illustrated in FIG. 1.

In order to prevent entry into a maneuvering area 103 of a vehicle 102 which is leaving a parking space, three different stop lines 104a, 140b, 104c are calculated. When the automated vehicle stops at the level of the line 104a, the vehicle 102 which is leaving a parking space would not be able to implement the planned parking-space-exiting maneuver, since the automated vehicle 101 would block the required maneuvering area 103. In order to avoid such a situation, a method which is comparable with the method outlined above runs in the automated vehicle 101. However, in contrast to the method sequence illustrated above, the boundary line 104b is firstly determined. When the vehicle stops at this boundary line 104b, the vehicle 102 leaving the parking space would be able to carry out its parking-space-exiting maneuver unimpeded. However, the space for this would be dimensioned very tightly. Therefore, in this exemplary embodiment, a predefined safety distance is included in the plan and the boundary line 104c is determined on the basis thereof. In this exemplary embodiment, the automated vehicle 101 is actuated on the basis of the provided signal in such a way that it does not travel over the boundary line 104c. For this, a stopping maneuver is carried out at the boundary line 104c.

In a further exemplary embodiment, the method for providing a signal for actuating an at least partially automated vehicle comprises the following steps.

Firstly, a parking-space-exiting process of a vehicle which is leaving a parking space is detected. Surroundings sensors sense the surroundings of the automated vehicle and make it possible to interpret and anticipate the traffic situation lying ahead using expanded map information (location-determining maps and planning maps), and to make more wide-ranging driving decisions for the automated vehicle. Furthermore, situations with longitudinal parking spaces and possibly diagonal parking spaces lying ahead are sensed and their degree of occupancy determined. In addition, it is determined whether a vehicle gives an indication from an occupied parking space of exiting the parking space. In this context, attention is made in particular to the detection of parking-space-exiting situations from diagonal parking spaces, since they require a relatively large maneuvering area.

When a vehicle which is leaving a parking space is detected, a required maneuvering area for executing a parking-space-exiting maneuver of the vehicle which is leaving the parking space is determined. The required maneuvering area is estimated here by, on the one hand, determining the wheel base of the vehicle which is leaving the parking space and, on the basis of this information, a maximum turning circle is derived. On the other hand, the available road width is determined. Furthermore, the available driving corridor is determined by determining further raised objects.

The number of driving movements with which the vehicle which is leaving the parking space can leave the parking space onto a lane for further travel is derived using this information. The maneuvering area which is anticipated to be required is determined using this trajectory and the dimensions of the vehicle. The wheel base and the dimensions of the vehicle are determined here by means of classification algorithms (based on video data, radar data and lidar data) and the retrieval of stored information.

After the maneuvering area has been determined, a stopping point which the automated vehicle should not drive over is determined. On the basis of the maneuvering area lying ahead a stopping line is determined for this in such a way that the front area of the automated vehicle is not in contact, including a safety distance, with the maneuvering area or does not enter said area.

In order to ensure that the automated vehicle actually does not enter the maneuvering area, a trajectory for reaching the determined stopping point is determined and applied. A trajectory is calculated from the current position of the automated vehicle to the stopping point using known methods, the automatic vehicle comfortably coming to a stop before entering the maneuvering area when it travels over said trajectory.

In a further exemplary embodiment, the speed of the automated vehicle is already reduced when the vehicle which is leaving a parking space is detected. This permits comfortable implementation of the stopping process at the determined stopping point.

What is claimed is:

1. A method for providing a signal for actuating an at least partially automated vehicle, comprising:
   receiving surroundings data;
   detecting a vehicle which is leaving a parking space and is initiating or executing a parking-space-exiting maneuver based on the received surroundings data;
   predicting a maneuvering area which the vehicle which is leaving the parking space requires to execute the parking-space-exiting maneuver;
   providing a signal configured to actuate the at least partially automated vehicle based on the predicted maneuvering area; and
   actuating the at least partially automated vehicle based on the signal, wherein the prediction of the maneuvering area comprises:
   determining a wheel base of the vehicle which is leaving the parking space, and wherein the detection of the vehicle which is leaving the parking space comprises:
   sensing at least one longitudinal parking space and/or diagonal parking space; and
   whether the sensed parking space is occupied.

2. The method according to claim 1, wherein the actuating the at least partially automated vehicle comprises:
   actuating the at least partially automated vehicle based on the signal to prevent the at least partially automated vehicle from entering the predicted maneuvering area during the parking-space-exiting maneuver of the vehicle which is leaving the parking space.

3. The method according to claim 2, wherein the actuating the at least partially automated vehicle comprises:
   actuating the at least partially automated vehicle such that it does not undershoot a predefined safety distance from the predicted maneuvering area during the parking-space-exiting maneuver, or the predicted maneuvering area is enlarged by a predefined safety distance.

4. The method according to claim 1, wherein the detection of the vehicle which is leaving the parking space comprises:
   analyzing a state of a flashing indicator light, brake light, reversing light, dipped headlight and/or passenger compartment lighting system of the vehicle which is leaving the parking space.

5. The method according to claim 1, wherein the detection of the vehicle which is leaving the parking space comprises:
   determining an orientation of the vehicle which is leaving the parking space with respect to a parking area and/or a lane which is being travelled on by the at least partially automated vehicle.

6. The method according to claim 5, wherein the detection of the vehicle which is leaving the parking space comprises:
   determining an angle of the orientation of the vehicle which is leaving the parking space with respect to a previously determined or received contour of the parking area and/or of the lane.

7. The method according to claim 1, wherein the prediction of the maneuvering area comprises:
   determining an available road width.

8. The method according to claim 1, wherein the prediction of the maneuvering area comprises:
   determining a number of required driving movements of the vehicle which is leaving the parking space in order to execute the parking-space-exiting maneuver based on vehicle dimensions of the vehicle which is leaving the parking space.

9. The method according to claim 8, wherein:
   the prediction of the maneuvering area comprises determining an available road width for the parking-space-exiting maneuver; and
   determining the number of required driving movements of the vehicle which is leaving the parking space in order to execute the parking-space-exiting maneuver is further based upon the determined available road width.

10. The method according to claim 1, wherein the prediction of the maneuvering area comprises:
    detecting raised objects; and
    determining an available driving corridor based on the detected raised objects.

11. The method according to claim 1, wherein a computing unit is configured to receive the surroundings data, detect the vehicle which is leaving the parking space and is initiating or executing the parking-space-exiting maneuver, predict the maneuvering area, and provide the signal.

12. The method according to claim 1, wherein a computer program includes commands which, during execution of the computer program by a computer, cause the computer to execute the method.

13. The method according to claim 12, wherein the computer program is stored on a machine-readable storage medium.

14. The method according to claim 1, wherein:
    the method further comprises determining a duration of the parking-space-exiting maneuver; and
    the provided signal configured to actuate the at least partially automated vehicle is further based on the determined duration.

* * * * *